United States Patent [19]
Kolze

[11] 4,406,306
[45] Sep. 27, 1983

[54] HEAT PUMP SWITCHOVER VALVE

[75] Inventor: Lawrence A. Kolze, Bensenville, Ill.

[73] Assignee: Eaton Corporation, Cleveland, Ohio

[21] Appl. No.: 359,731

[22] Filed: Mar. 19, 1982

[51] Int. Cl.³ .......................................... F16K 31/122
[52] U.S. Cl. ................................ 62/324.6; 137/625.43
[58] Field of Search ........................... 62/324.1, 324.7; 137/625.43, 625

[56] References Cited

U.S. PATENT DOCUMENTS

| | | | |
|---|---|---|---|
| 2,974,682 | 3/1961 | Trask | 137/625.43 X |
| 2,976,701 | 3/1961 | Greenawalt | 62/324.6 |
| 3,032,312 | 5/1962 | Greenawalt | 251/356 |
| 3,056,574 | 10/1962 | Greenawalt | 251/31 |
| 3,349,800 | 10/1967 | Herioe et al. | 137/625 |
| 3,357,453 | 12/1967 | Mingrone et al. | 137/625 |
| 3,527,256 | 9/1970 | Colombo | 62/324.7 |
| 3,867,960 | 2/1975 | Hosoda et al. | 62/324.7 |
| 3,894,561 | 7/1975 | Thornbery | 137/625 |
| 3,985,154 | 10/1976 | Hargraves | 137/625 |
| 4,144,905 | 3/1979 | Bauer | 137/625 |
| 4,212,324 | 7/1980 | Bauer | 137/625 |

OTHER PUBLICATIONS

Product Specification No. 13.62T-40IR Series Reversing Valve for Heat Pumps ½" and 1" Port Sizes; Alco Controls Div.-Emerson Electric; pp. 1-4.

*Primary Examiner*—Lloyd L. King
*Attorney, Agent, or Firm*—C. H. Grace; J. G. Lewis; R. A. Johnston

[57] ABSTRACT

A switchover valve (20) is employed within a heat pump system (10) including a heat exchanger coil (14) within a structure (18) to be heated and cooled, and a second heat exchanger coil (16) external of the structure and in fluid communication with the first coil. The system also includes a compressor (12) which circulates a refrigerant between the coils to effect a net heat transfer into or out of the structure. The switchover valve operates to selectively reverse the flow of refrigerant between the coils, depending upon the operating mode of the system. The valve comprises a body (64) defining inlet and suction ports (22 & 28) for interconnection with the compressor and two reversing valve ports (36 & 40) for interconnection with the coils, a solenoid (196) operated pilot valve (153) and a slave valve (121) for selectively interconnecting the inlet port with one of the reversing valve ports, and a shuttle poppet valve (235) for interconnecting the suction port with the remaining reversing valve port.

14 Claims, 4 Drawing Figures

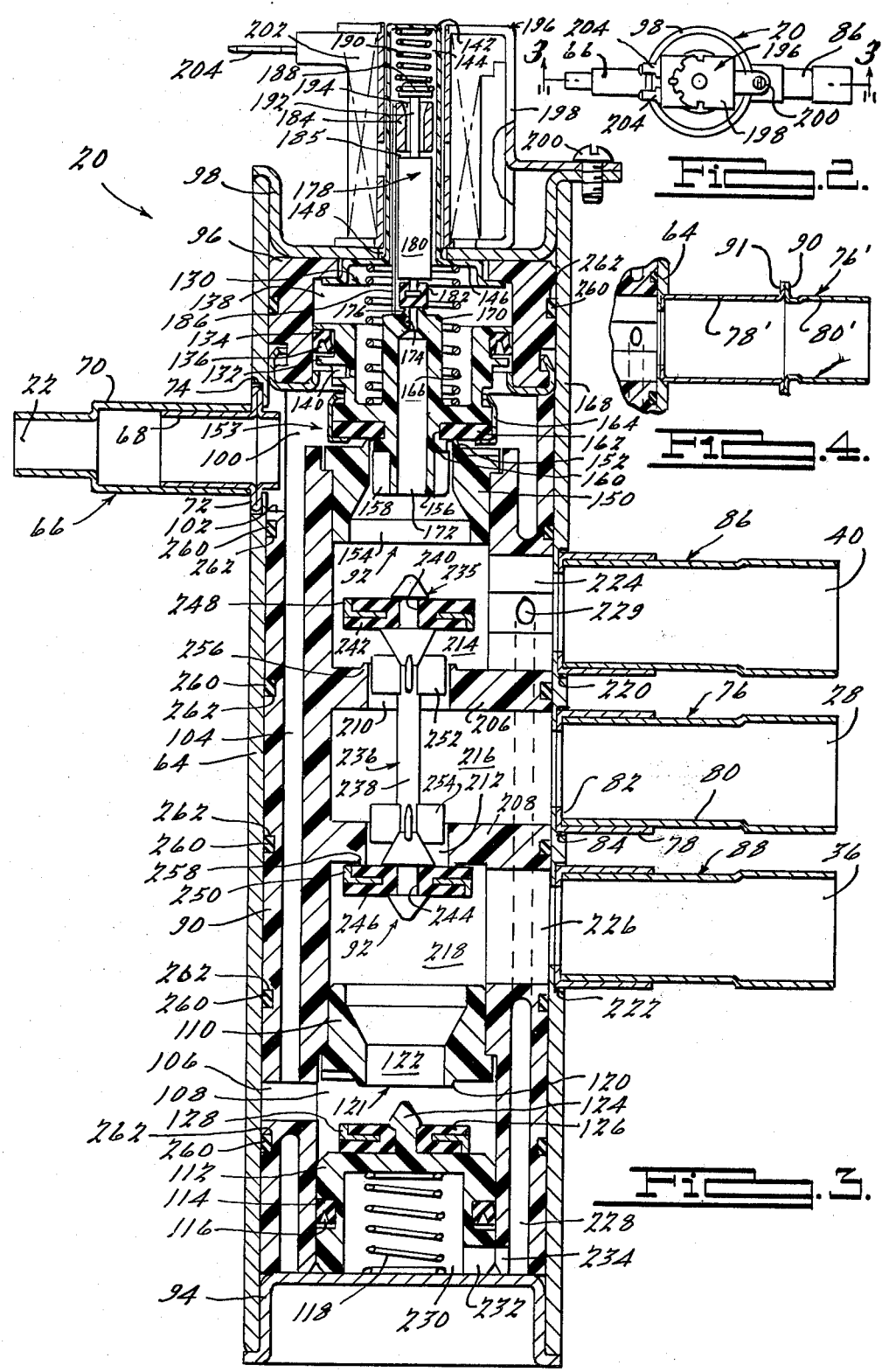

HEAT PUMP SWITCHOVER VALVE

FIELD OF THE INVENTION

The present invention relates to reversing or switchover valves and to heat pump systems employing such valves. In particular, the present invention relates to improved switchover valve construction for enhanced heat pump system operation.

CROSS-REFERENCE

The invention described in the present application is related, in certain respects, to U.S. Pat. Nos. 4,174,824 and 4,283,040.

BACKGROUND OF THE INVENTION

The heat pump is the name commonly applied in present commercial practice to a year-round air-conditioning system employing refrigeration equipment in a manner which enables a surface to deliver usable heat to a space during the winter period and to abstract heat from the space during the summer. When operating the heating system, the cooling coils, or evaporator, absorb heat from an outside medium and deliver it, together with a heat equivalent of the work of compression, to the condenser, which in turn gives it up to the space to be heated. On the other hand, when operating as a cooling system, the evaporating coils absorb heat from the conditioned space, and reject it, together with the heat equivalent with the work of compression, to the outside medium. There is no fundamental difference between the heat pump and a conventional refrigeration system. Thermodynamically both systems are heat pumps employing a compressor, condenser, cooling coils, and expansion valve to absorb heat at a low-temperature level and reject it at a higher-temperature level. The idea of an apparatus comprising the basic heat pump has been well-known since the time of Lord Kelvin and has been widely employed in both industrial and residential applications.

The four basic-type heat pump systems for building heating and cooling most commonly employed are: (1) air to air, in which air is used as the source of heat and air is used to remove the heat from the condenser; (2) water to air, in which water is used as the heat source and air is used to remove the heat from the condenser; (3) air to liquid, in which air is used as the source of heat and liquid is used to transfer the heat from the condenser and chiller; and (4) water to water, in which water is used as the heat source and water is used to transfer the heat from the condenser and chiller. The application described herein is addressed to the air to air type system, which is the most common type employed in residential applications. However, as will become apparent upon further reading of the present specification, the present invention is equally applicable to other type systems.

Reversing or switchover valves are employed in heat pump systems to receive refrigerant from the compressor and to selectively divert it to either the indoor or outdoor heat exchanger coils, dependent upon the system mode (heating or cooling) of operation. The valve simultaneously operates to communicate the suction port of the compressor with the coil not presently connected to the compressor outlet.

Numerous reversing valve designs are disclosed in the patent literature. Although enjoying varying degrees of commercial success, most prior art devices have a number of shortcomings. Typically, an externally mounted three-way control valve is employed to modulate a larger spool valve. In addition to being expensive, this arrangement proves to be vulnerable to damage by requiring external plumbing for fluidly interconnecting the control and spool valves. A related problem resides in this arrangement's inherent bulkiness and packaging difficulty with other components in a heat pump system. Many reversing valves are touted as having all metal construction within extemely close tolerances. Although functional, such devices often prove to be extremely expensive due to the large number of high precision machining operations required as well as the enhanced difficulty in manufacture and assembly. Finally, many prior art valves require high force actuators to ensure positive operation. Such actuators can substantially increase electrical power consumption and thereby reduce overall system operating efficiency as well as to slow response time of the valve.

BRIEF DESCRIPTION OF THE INVENTION

The present invention overcomes the above-described shortcomings of the prior art by providing an improved heat pump switchover valve which employs simple construction and inexpensive materials and manufacturing processes as well as is packaged in a single compact unit. This is accomplished by an improved switchover valve incorporating three separate valve functions within a single body which defines inlet and suction ports as well as first and second reversing valve ports, the first valve operating to selectively interconnect the inlet port with the first reversing valve port when an associated actuator receives a control signal, the second valve operates to selectively interconnect the inlet port with a second reversing valve port as a function of fluid pressure differential between the inlet port and the first reversing valve port, and the third valve operates to selectively, alternately interconnect the suction port with the first or second reversing valve port as a function of sensed fluid pressure differential between the suction port and the reversing valve ports. This arrangement has the advantage of providing simply constructed compact assembly in which the three-way control valve, typically required for prior art devices, is eliminated.

According to another aspect of the invention the valve body comprises a closed elongated tubular housing which defines a stepped bore communicating internally with each of the ports. The first valve includes a piston disposed within the bore at one end thereof which is axially displacable to establish communication between the inlet port and the first reversing port. Furthermore, the actuator comprises a solenoid which effects displacement of the piston in response to energization by a control signal to cover or uncover a pilot bore within the piston to effect pilot operation thereof. This arrangement has the advantage of providing fast responding pilot operation of the valve.

According to another aspect of the invention, the second valve means comprises a second piston slidably disposed in the bore at the opposite end of the housing and displaceable between a first position in which the second piston abuts a second valve seat to interrupt fluid communication between the inlet port and the second reversing valve port, and a second position in which the second piston is axially spaced from the second valve seat. A spring is provided to bias the second piston towards its first position. This arrangement has the advantage of providing a slave valve of simplified construction and reduces the mass of the primary valving element (first piston) to enhance response time.

According to another aspect of the invention, the third valve means comprises a shuttle valve assembly which is slidably disposed within the bore intermediate the first and second pistons and displaceable between a first position which the suction port is in fluid communication with the first reversing valve port while fluidically isolated from the second reversing valve port, and a second position in which the suction port is in fluid communication with the second reversing valve port while fluidly isolated from the first reversing valve port. This arrangement, like that of the second valve, provides for low cost, simple construction slave valve operation within a single compact unit.

According to another aspect of the invention, each port is defined by a port assembly constructed of a first metal similar to the material comprising the outer housing of the body and affixed thereto, and a second material depending outwardly from the first material and adapted for interconnection with an intended system conduit formed of said second material. This arrangement has the advantage of inexpensively providing for ease of application of the valve while insuring high quality welds or other suitable attachment operations relating to the interfacing of the valve with its associated system.

According to still another aspect of the invention, the actuator means comprises a magnetomotive force actuator comprising a nonmagnetic guide hollow for movably receiving a floating pole piece and an armature therein formed of ferromagnetic material. The armature is movable with respect to the pole piece between a first position spaced a predetermined distance from the pole piece in which position fluid communication between the input port and the first reversing valve port is interrupted and a second position less than said predetermined distance from the pole piece in which second position fluid communication between the inlet port and the first reversing valve port is established, and stop means cooperating with the pole piece and the armature and movable therewith to limit the movement of the first piston relative to the pole piece. This arrangement has the advantage of providing extremely fast response time employing a control signal of substantially reduced power level.

These and other features and advantages of this invention will become apparent upon reading the following specification, which, along with the patent drawings, describes and discloses a preferred illustrative embodiment of the invention in detail.

The detailed description of the specific embodiment makes reference to the accompanying drawings.

BRIEF DESCRIPTION OF THE DRAWINGS

FIG. 2, is a top plan view of the preferred embodiment of the heat pump switchover valve;

FIG. 3, is a cross-sectional view taken on line 3—3 of FIG. 2; and

FIG. 4, is a fragmentary cross-sectional view of a port assembly of an alternative embodiment of the invention.

DETAILED DESCRIPTION OF THE PREFERRED EMBODIMENT

Figure 1A:
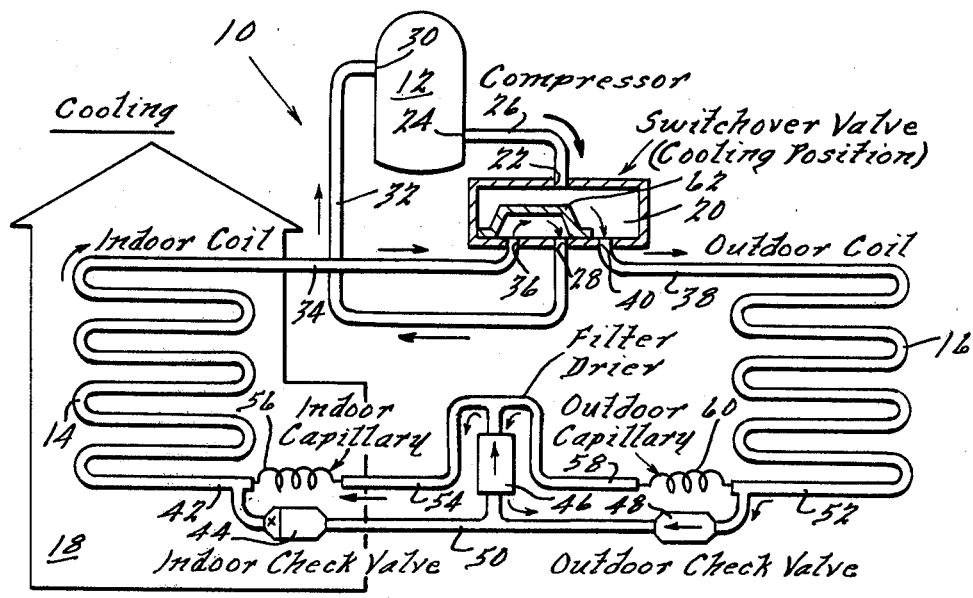
FIG. 1a, is a schematic illustration of a heat pump system employing the inventive heat pump switchover valve in the cooling mode of operation.
Figure 1B:
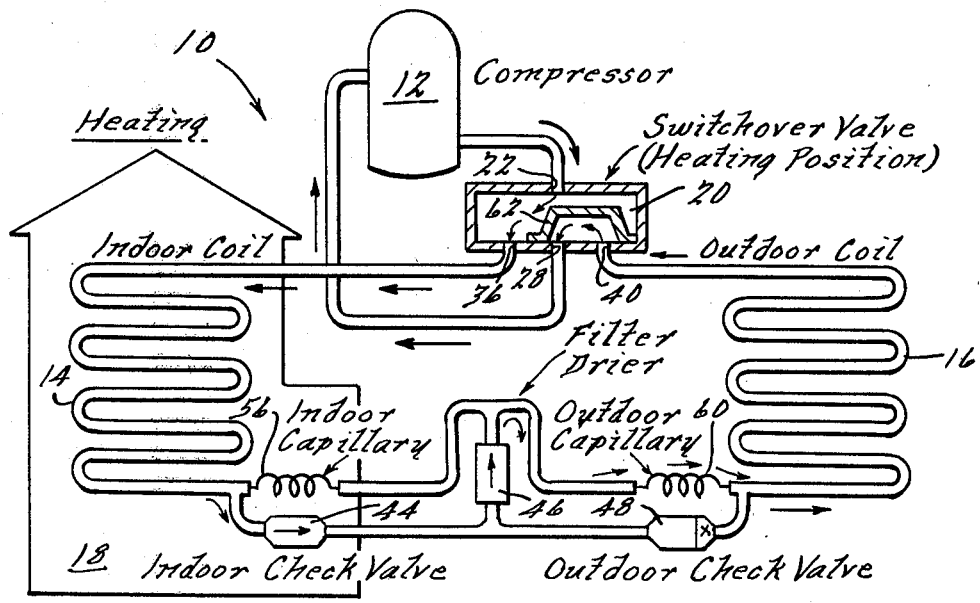
FIG. 1b, is a schematic view of the system of FIG. 1 in the heating mode of operation.

Referring to FIGS. 1a and 1b, and typical heat pump system 10 is illustrated in a cooling and heating operating mode, respectively. System 10 comprises a compressor 12, a first heat exchanger coil 14 and a second heat exchanger coil 16. Coil 14 is disposed within a structure 18 which is to be heated and cooled by system 10. Coil 16 is located external to structure 18. Although intended primarily for residential or domestic application, the present invention can also be applied to commercial or other large scale applications. In addition, it is illustrated as being of the type to effect air-to-air heat transfer. However, the present invention could be equally well applied other types of media, as outlined hereinabove. Accordingly, the illustrated application is by way of example only and not to be considered limiting.

An inventive switchover valve 20 is included within system 10 to effect a flow reversal of refrigerant dependent upon system operating mode. Valve 20 is shown schematically as including an inlet port 22 fluidly interconnected with a pressure or outlet port 24 of compressor 12 by a conduit 26. Valve 20 also has a suction port 28 fluidly interconnected with a suction port 30 of compressor 12 through another conduit 32. Heat exchanger coil 14 is constructed of conduit arranged in serpentine fashion having one end thereof, designated 34, fluidly interconnected with a reversing valve port 36 within switchover valve 20. Likewise, heat exchanger coil 16 is constructed of conduit formed in serpentine fashion having one end thereof, designated 38 connected to another reversing valve port 40 within switchover valve 20.

The remaining end of heat exchanger coil 14, designated 42, is fluidly connected to a check valve 44 so that fluid can exit but not enter the end 42 of coil 14 through check valve 44. Check valve 44 is, in turn, fluidly interconnected to a filter-dryer 46 and a second check valve 48 through a conduit 50. Check valve 48 is, in turn, connected to the remaining end, designated 52, of heat exchanger coil 16 such that fluid can exit but not enter end 52 of coil 16. Finally, filter-dryer 46 is fluidly interconnected with end 42 of coil 14 through a series combination of a conduit 54 and an indoor capillary 56, and with end 52 of coil 16 through a series combination of a conduit 58 and an outdoor capillary 60.

Switchover valve 20 is illustrated in simplified schematic form to facilitate understanding of overall system operation. It is to be understood that several valving functions of the present invention are consolidated in FIG. 1 into a single valving element 62. Switchover valve 20, as illustrated in FIG. 1, could apply to prior art devices as well as the present invention. For that reason, a valve actuator logic and structure, which normally would be required in any actual system, has been deleted for the sake of simplification. Additionally, no controller for heat pump system 10 has been illustrated, it being understood that basic operation of the system is well known to those skilled in the art. Accordingly, for the sake of brevity, only a brief description of system 10 operation will be given herein.

Heat pump system 10 operates basically to absorb heat at a low-temperature level and reject it at a higher-temperature level. Thus, in the winter or heating mode of operation, system 10 will absorb heat from the relatively cool atmosphere surrounding structure 18, impart it to refrigerant flowing through heat exchanger coil 16, transfer it to heat exchanger coil 14 within structure 18 by virtue of circulating fluid flow between coils 14 and 16 and ultimately discharge the heat within structure 18. In the summer or cooling mode system operation, the above-described heat transfer process is reversed.

Referring to FIG. 1a, system 10 in its cooling mode of operation. Compressor 12 is operated to discharge a refrigerant, such as freon 22, from its pressure outlet port 24 to switchover valve 20. Refrigerant enters switchover valve 20 through inlet port 22 and exits via reversing valve port 40 to heat exchanger coil 16. In this mode, valving element 62 is positioned within switchover valve 20 to fluidly interconnect suction port 28 with reversing valve port 36. Refrigerant passing through outdoor coil 16 expells heat to ambient air and exits coil 16 through check valve 48. Contamination and moisture are removed from the refrigerant in filter-dryer 46 which is then passed through indoor capillary 56 which operates as an expansion valve to lower refrigerant pressure and temperature. Refrigerant is then discharged into heat exchanger coil 14 wherein it absorbs heat from within structure 18 and is returned to suction port 30 of compressor 12 after passing through reversing valve port 36 and suction port 28 of switchover valve 20.

In the heating mode of operation valving element 62 is displaced to fluidly interconnect suction port 28 and reversing valve port 40 of switchover valve 20. The operation of the system 10 is the opposite as was described immediately hereinabove wherein refrigerant exiting compressor 12 enters inlet port 22 of switchover valve 20 and exits via reversing valve port 36 to heat exchanger coil 14. See FIG. 1b. Here, heat is expelled from coil 14 into structure 18 and it is absorbed into the refrigerant within coil 16 for ultimate return via compressor 12.

Referring to FIGS. 2 and 3, the preferred embodiment of the inventive switchover valve 20 is illustrated. Switchover valve 20 comprises an elongated tubular steel body 64 which compactly houses all of the valving elements of switchover valve 20. Inlet port 22 is defined by a radially outwardly directed port assembly 66 comprised of a steel tube 68 and a copper tube 70. Steel tube 68 has a circumferential flange 72 integrally formed therein which is received within a stepped bore 74 in body 64. Stepped bore 74 provides a planar mating surface for locating port assembly 66 and for interconnection by electric resistance welding or other suitable process. Tube 70 is telescopingly received externally of tube 68 and is affixed thereto such as by silver soldering or suitable brazing process. The free end of tube 70 is necked to facilitate mating with conduit 26 which is also constructed of copper, by brazing or soldering.

Suction port 28 is likewise defined by a port assembly 76 comprised of a steel tube 78 telescopingly receiving a copper tube 80. The lefthandmost end (as viewed in FIG. 3) of tube 78 forms an inwardly turned flange 82 which abuts a mating surface defined by a stepped bore 84 in body 64. Again, flange 82 is resistance welded to body 64 and tubes 78 and 80 are interconnected by silver soldering. First and second reversing valve ports 40 and 36 are defined by port assemblies 86 and 88, respectively, which are constructed substantially identically to port assembly 76. The copper tubes of port assemblies 76, 86 and 88 are necked to receive conduit/coil ends 32, 38 and 34, respectively. Port assemblies 66, 76, 86 and 88 are constructed for preassembly of the steel and copper tubes prior to attachment to body 64. The materials were selected whereby each end of each port assembly is attached to a conduit or housing of a material similar to its own to ensure high quality and integrity, low cost weldments, both in manufacturing and field installation.

FIG. 4 illustrates an alternative embodiment of port assembly 76 (also 86 and 88) designated 76', in which, rather than being telescopingly received, a copper tube 80' has an outwardly directed integral flange 90 at the lefthandmost extent thereof which mates with a similar flange 91 integrally formed on the righthandmost most extent of a steel tube 78'. Tubes 78' and 80' are soldered or welded together about flanges 90 and 91 to comprise alternative port assembly 76'.

A cylindrical body member 90 is matingly disposed within body 64. Body member 90 is constructed of injection molded high quality plastic such as glass filled nylon. It is contemplated that other suitable materials could be substituted however. Member 90 defines a stepped bore shown generally at 92 passing entirely therethrough as will be described in detail hereinbelow. The lower end of body 64 (as viewed in FIG. 3) is closed by a cup-shaped steel closure member 94 which is press fit therein and welded about the periphery thereof to effect a hermetic seal. Body member 90 extends upwardly from closure member 94 to a point just above port assembly 66. A second cylindrical plastic body member 96 is nestingly disposed in the upper end of body 64 and abuts the uppermost surface of body member 90. A second cup-shaped steel closure member 98 is press fit within the upper end of body 64 and circumferentially welded about to form a hermetic seal therebetween. Closure members 94 and 98 thus serve to close body 64 and secure body members 90 and 96 axially in their illustrated positions.

Inlet port 22 opens into an annular cavity 100 defined by body member 90 concentrically with and radially outwardly from stepped bore 92. Port 22 passes through bore 74 as well as a registering notch 102 in body member 90. An axially extending passageway 104 fluidly interconnects cavity 100 with a radially inwardly directed bore 106 within body member 90. Bore 106 is closed at its radially outwardmost extent by body 64 and opens radially inwardly into a chamber 108 defined by a portion of stepped bore 92. An annular plastic plug 110 is press fit within bore 92 to define the uppermost extent of chamber 108. A downwardly opening cup-shaped plastic piston 112 is slidably disposed within bore 92. The uppermost surface of piston 112 defines the lowermost extent of chamber 108. A sliding lip seal 114 is disposed within an outwardly opening recess 116 in piston 112 to effect continuous sealing engagement between piston 112 and body member 90. Axial displacement of piston 112 is limited upwardly by plug 110 and downwardly by closure member 94. In its illustrated position, piston 112 is in a designated second position spaced from plug 110. A spring 118 disposed within bore 92 bears downwardly against the uppermost surface of closure member 94 and upwardly against piston 112 to bias piston 112 upwardly. Spring 118 is illustrated in its compressed condition. The lowermost surface of plug 110 defines a valve seat 120 circumscribing a through passageway 122. A protuberance 124 integrally depends upwardly from piston 112, passing through the center of an annular rubber seal 126. Seal 126 has a wave washer 128 or the like molded therein for rigidity. A second or slave valve is shown generally at 121.

When piston 112 is in its illustrated position, valve seal 126 is spaced from seat 120 allowing free fluid communication between chamber 108 and passageway 122. When spring 118 displaces piston 112 upwardly until seal 126 abuts seat 120, a designated first position, the path of fluid communication between chamber 108 and passageway 122 is obstructed.

Cylindrical body member 96 defines a stepped bore 130 coaxial with bore 92. A plastic piston 132 be slidably received within bore 130. A rubber sliding lip seal 134 is disposed within an annular outwardly opening cavity 136 within piston 132 and provides a fluid seal between cavity 100 and the portion of stepped bore 130 above the uppermost portion of piston 132 designated herein as bleed chamber 138. A bleed orifice 140 is integrally formed within piston 132 to permit pressure equalization between cavity 100 and bleed chamber 138, the orifice 140 being of sufficiently reduced size to create a substantial pressure drop thereacross. The bleed chamber 138 is formed partially by a guide member 142 which is formed of nonmagnetic material, and has an elongated portion with a cylindrical bore or hollow 144 provided therein communicating with bleed chamber 138. Guide member 142 includes an outwardly directed stepped flange 146 which abuts the lowermost surface of closure member 98 and a step defined by bore 130 in body member 96. The portion of guide member 142 defining bore 144 projects upwardly through an aperture 148 within closure member 98 and is welded thereto to provide a hermetic seal therebetween.

A pilot valve is shown generally at 153. An annular molded plastic plug 150 is press fit within bore 92 of body member 90. An upwardly extending valve seat 152 is integrally formed in plug 150 which circumscribes a central passageway 154 therein. Piston 132 has a downwardly projecting pilot portion 156 which is loosely received within passageway 154 and defines a number of circumferentially spaced radial recesses 158 therein to permit passage of fluid therethrough and to prevent sticking of pilot portion 156 within passageway 154. Pilot portion 156 defines a radially outwardly opening annular recess 160. An annular rubber valve seal 162 is disposed with recess 160 for retention therewith. An annular outer metal clamp 164 secures the radially outwardmost portion of seal 162 to piston 132. Piston 132 is illustrated in its downwardmost limit of travel wherein seal 162 is in an abutting relationship with valve seat 152. This is designated as a first position. A spring 166 bears upwardly against flange 146 and downwardly against piston 132 to urge piston 132 into the first (illustrated) position. A clamp 168 is provided which mechanically embraces the lowermost portion of body member 96 to ensure that piston 132 is retained in its illustrated position prior to final asembly within body 64.

Piston 132 includes an upwardly extending center portion 170 which serves to radially locate spring 166. A main pilot bore 172 extends axially substantially through the pilot portion 156 and center portion 170 of piston 132. The uppermost end of bore 172 communicates with bleed chamber 138 through a small aperture or pilot orifice 174. The uppermost extent of center portion 170 defines an integral upwardly extending pilot valve seat 176. A solenoid armature assembly 178 is loosely or movably disposed within bore 144 and comprises a lower armature 180, a rubber armature tip 182, an upper armature or floating pole piece 184, armature standoff or stop 186, a plastic spring retainer 188 and a spring 190. Upper and lower armatures 184 and 180 are constructed of ferromagnetic material such as magnetic stainless steel and armature standoff 186 is constructed of nonferromagnetic material such as nonmagnetic stainless steel shim stock. Spring 190 acts, through assembly 178, to bias tip 182 against valve seat 176 to close off aperture 174. Spring 190 bears upwardly against guide member 142 and downwardly against the uppermost portion of spring retainer 188. Spring retainer 188 has a downwardly extending guide pin 192 integrally formed therewith which loosely passes through a bore 194 within upper armature 184. The lowermost end of pin 192 abuts the upper surface of lower armature 180. Dimensionally, guide pin 192 is slightly longer than the vertical extent of upper armature 184. The uppermost end of armature standoff 186 is welded to upper armature 184. Armature standoff extends downwardly below the lowermost extent of upper armature 184 and extends slightly greater than the combined extent of lower armature 180, armature tip 182 and pilot valve seat 176 to ensure that a predetermined gap or distance 185 is established between the lowermost surface of upper armature 184 and the uppermost surface of lower armature 180 when assembly 178 and piston 132 are in the relative positions illustrated. The lowermost surface of armature standoff 186 loosely abuts the uppermost surface of center portion 170 of piston 132.

A solenoid coil assembly 196 is received over the outer surface of the portion of guide member 142 defining bore 144. Coil assembly 196 includes a frame 198 rigidly retained to closure member 98 by a screw 200 or other suitable fastening means. Coil assembly 196 also includes a coil 202 electrically insulated from frame 198 and the remainder of switchover valve 20 and provided with externally accessible insulated terminals 204. When coil 202 is energized by the application of a control signal thereto via terminals 204, a magnetic field is established within bore 144. The magnetic field will operate to displace lower armature 180 and armature tip 182 upwardly, uncovering aperture 174 and thus providing a path of fluid communication between bleed chamber 188 and pilot bore 172.

The applicant has found that the small air gap type construction described immediately hereinabove provides a greatly improved switchover valve 20 requiring substantially less electrical energy for the application thereof without adversely effecting response. Thus, the present invention serves to enhance overall heat pump system operating efficiency. The details of operation of the pilot valve and solenoid portions of the present invention will not be elaborated upon here inasmuch as they are described in detail in U.S. Pat. Nos. 4,174,824 and 4,283,040 which are hereby incorporated herein by reference. The applicant commends the reader to those citations. The outer tube, designated 82, in U.S. Pat. No. 4,283,040 serves the same function as does the present standoff 186. When coil 202 is energized, lower armature 180, being constructed of magnetic stainless steel, will be displaced upwardly, partially compressing spring 190. The upper surface of lower armature 180 will contact the lower surface of upper armature 184, (also constructed of magnetic stainless steel) to uncover pilot orifice 174. When orifice 174 is uncovered a pressure drop across piston 132 will occur, causing piston 132 to lift off of valve seat 152. Once the pilot operation of piston 132 is over and it moves to its upper position opening flow between inlet port 22 and reversing valve port 40, hydraulic pressure will displace the entire assembly 178 upwardly, further compressing spring 190 until piston 132 reaches its uppermost or second limit of travel. The purpose of the standoff 186 always ensures a space relationship between upper armature 184 and piston 132 so that lower armature 180 and armature tip 182 will remain spaced from seat 176 at all times during pilot operation of pilot valve 153.

Heat pump system 10 operates in a fail-safe mode wherein no control signal is required to ensure heating operation. Thus, during the heating season, the valve will be as illustrated in FIG. 3 and without a control signal. When a control signal is received at terminals 204, a pilot flow path is established and piston 132 is displaced upwardly from its illustrated first position to a second position wherein valve seal 162 is axially displaced from valve seat 152. This will provide a path of fluid communication from cavity 100 into passageway 154.

Two partitions 206 and 208 are integrally formed within body member 90 at spaced points intermediate plugs 110 and 150. Bore 92 includes axially extending apertures 210 and 212 within partitions 206 and 208, respectively. The portion of bore 92 above partition 206 and below plug 150 is defined as a chamber 214. The portion of bore 92 below the lowermost surface of partition 206 and above the uppermost portion of partition 208 is defined as chamber 216. Likewise, the portion of bore 92 above plug 110 and below the lowermost surface of partition 208 is defined as chamber 218. Suction port 28 communicates directly with chamber 216 through bore 84 within body 64. Likewise, first and second reversing valve ports 40 and 36 communicate directly with chambers 214 and 218, respectively, through stepped bores 220 and 222 in body 64, respectively, and registering bores 224 and 226, respectively, formed in body member 90. An axially extending passageway 228 has the uppermost end 229 thereof communicating with chamber 214 through bore 224. The lowermost end of passageway 228 communicates with a chamber 230 through registering notches 232 and 234 within the lowermost portion of piston 112 and body member 90, respectively. Chamber 230 is defined by the lowermost surface of piston 112 and the uppermost surface of closure member 94.

A shuttle poppet valve, shown generally at 235, comprises a shuttle poppet valve assembly 236 disposed within bore 92. Assembly 236 includes a shuttle rod member 238 which traverses chamber 216, terminating at the upper extent thereof within chamber 214 and at the lower extent thereof within chamber 218. A radially outwardly opening annular recess 240 is defined within shuttle rod member 238 near the upper end thereof to receive an annular rubber valve poppet 242 therein. Likewise, another radially outwardly opening annular notch 244 is defined within the lower end of shuttle rod member 238 to receive a second rubber valve or poppet 246. Valve poppets 242 and 246 have wave washers 248 and 250, respectively, molded therein for structural rigidity. Rod member 238 has two sets of circumferentially spaced outwardly depending guides 252 and 254 integrally formed therewith and axially spaced along rod member 238 so as to remain at all times at least partially positioned within apertures 210 and 212, respectively. An upwardly extending valve seat 256 integrally depends from the uppermost surface of partition 206 within chamber 214 circumscribing aperture 210. Likewise, a second valve seat 258 is integrally formed from the lowermost surface of partition 208 and projects downwardly therefrom circumscribing aperture 212. Shuttle rod member 238 is dimensioned so that guides 252 and 254 are loosely disposed within apertures 210 and 212, respectively, to restrain shuttle poppet valve assembly 236 radially but to permit it limited axial displacement within bore 92. Valve assembly 236 is illustrated in its first or uppermost position wherein valve poppet 246 abuts valve seat 258. When valve assembly 236 is so displaced upwardly, the path of fluid communication between chambers 218 and 216 is closed and a path of fluid communication between chambers 214 and 216 is established by virtue of valve poppet 248 being axially displaced upwardly from valve seat 256. When valve assembly 236 is displaced downwardly so that valve poppet 242 abuts valve seat 256, the path of fluid communication between chambers 214 and 216 is closed and a path of fluid communication between chambers 216 and 218 is established by virtue of valve poppet 246 being axially displaced downwardly from valve seat 258. A number of O-rings 260 are received within radially outwardly opening annular notches 262 within body members 90 and 96 at selected spaced points there along to provide for positive sealing between body members 90 and 96 and the inner surface of body 64.

The operation of switchover valve 20 is as follows: when inlet port 22 is pressurized and coil 202 is deenergized, flow occurs from inlet port 22 through passageway 104 and into chamber 108. Pressure in chamber 108 lifts piston 112 off seat 120 to allow flow to second reversing valve port 36. Piston 112 moves off its seat 120 against the biasing spring 118 due to the differential pressure existing across chambers 108 and 230. Chamber 230 communicates with passageway 228 to first reversing valve port 40. First reversing valve port 40 is at a lower pressure than inlet port 22 or the pressure in chamber 108, therefore piston 112 is lifted off seat 120. When flow occurs to second reversing port 36, a pressure drop is also created between second reversing valve port 36 and suction port 28. This pressure drop forces valve poppet 246 to close against its seat 258 to close off the flow into suction port 28 which is flowing through second reversing valve port 36. As valve poppet 246 is forced against seat 258, valve poppet 242 is pushed off seat 256 through shuttle rod member 238, creating a communication between first reversing valve port 40 and suction port 28. When coil 202 is energized, lower armature 180 closes the gap 185, lifting armature tip 182 off of pilot valve seat 176. This creates pressure differential across piston 132 to allow its movement off its seat 152. As piston 132 lifts off its seat 152, pressure is introduced into chamber 214, first reversing valve port 40, passageway 228, and chamber 230. As piston 132 moves to its full open position, pressure in chamber 230 and chamber 108 tend to reach equal values. At this point, the biasing spring 118 and the flowing pressure drop occurring across seat 120 cause piston 112 to close against seat 120. When piston 112 closes against seat 120, pressure at second reversing valve port 36 is cut off and drops in value. However, as chamber 214 is now pressurized, a flow occurs to first reversing valve port 40 and suction port 28. Flow to suction port 28 across valve poppet 242 and seat 256 create pressure drop across valve poppet 242 to force it against its seat 256. In this condition, flow is now established from pressure inlet port 22 to first reversing valve port 40 with communication between suction port 28 and second reversing valve port 36. The forcing of valve poppet 242 against its seat 256 also moves valve poppet 246 via shuttle rod member 238 to an open position for communication between suction port 28 and second reversing valve port 36. Deenergizing coil 202 closes piston 132 to its first position against seat 152 by the biasing effect of spring 166 and allows piston 112 to open to its second position to bring valve 20 to its normal or illustrated position as previously described.

It is to be understood that the invention has been described with reference to a specific embodiment which provides the features and advantages previously described, and as such specific embodiment is susceptible to modification as will be apparent to those skilled in the art. For example, body members 90 and 96, pistons 112 and 132, plugs 110 and 150 and shuttle rod member 238 are constructed of injection molded, high quality plastic such as glass filled nylon. However, it is understood that other materials can be substituted, depending on intended application, materials specifications and the like. Accordingly, the foregoing description is not to be construed in a limiting sense.

I claim:

1. A heat pump switchover valve comprising: body means defining,
   (i) an inlet port,
   (ii) first and second reversing valve ports, and
   (iii) a suction port;
   first valve means operative to selectively interconnect said inlet port and said first reversing valve port for fluid communication therebetween;
   actuator means operatively engaging said first valve means to establish said fluid communication in response to a control signal;
   second valve means operative to selectively interconnect said inlet port and said second reversing valve port as a function of sensed fluid pressure differential between said inlet port and said first reversing valve port; and
   third valve means operative to selectively, alternately interconnect said suction port with said first and second reversing valve ports as a function of sensed fluid pressure differential between said suction port and said first and second reversing valve ports.

2. The valve of claim 1, wherein said body means comprises a substantially closed, elongated housing defining a stepped bore communicating with said ports, and said first valve means comprises a piston slidably disposed within said bore proximate one end thereof and displacable between a first position in which said piston abuts a first valve seat to interrupt said fluid communication between said inlet port and said first reversing valve port, and a second position in which said piston is axially spaced from said first valve seat.

3. The valve of claim 2, wherein said actuator means comprises a solenoid operative to effect displacement of said piston between said first and second positions.

4. The valve of claim 3, wherein said piston defines a pilot bore for fluidically communicating said inlet port with said first reversing valve port when said piston is in said first position, and wherein said solenoid comprises an axially displacable armature operative to effect selective obstruction of said pilot bore in response to said control signal.

5. The valve of claim 2, further comprising means operative to bias said piston toward said first position.

6. The valve of claim 2, wherein said second valve means comprises a second piston slidably disposed within said bore proximate another end thereof distal said first recited piston and displacable between a first position in which said second piston abuts a second valve seat to interrupt fluid communication between said inlet port and said second reversing valve port, and a second position in which said second piston is axially spaced from said second valve seat.

7. The valve of claim 6, further comprising means operative to bias said second piston toward said first position.

8. The valve of claim 6, wherein said third valve means comprises a shuttle valve slidably disposed within said bore intermediate said first and second pistons and displacable between a first position in which said suction port is in fluid communication with said first reversing valve port while fluidically isolated from said second reversing valve port, and a second position in which said suction port is in fluid communication with said second reversing valve port while fluidically isolated from said first reversing valve port.

9. The valve of claim 1, wherein said body means comprises a tubular outer housing formed of a first material and a plurality of port assemblies depending outwardly therefrom, each said port assembly defining one of said ports and at least one of said port assemblies comprising a first tubular member carried by said housing and formed of a material substantially identical to said first material and a second tubular member carried by said first tubular member and formed of a second material.

10. The valve of claim 9, wherein said first material comprises steel and said second material comprises copper.

11. The valve of claim 1, wherein said actuator means comprises magnetomotive force means including,
   (i) means defining a guide hollow having the walls thereof formed of nonmagnetic material,
   (ii) floating pole piece means formed of ferromagnetic material and movably received in said guide hollow,
   (iii) armature means formed of ferromagnetic material and movably received in said guide hollow and movable with respect to said pole piece means between a first position spaced a predetermined distance from said pole piece means in which first position said fluid communication is interrupted and a second position less than said predetermined distance from said pole piece means in which second position said fluid communication is established, and
   (iv) stop means cooperating with said pole piece and said armature means and movable therewith, said stop means being operable to limit the movement of said first valve means relative to said pole piece means.

12. A heat pump system comprising:
   a first heat exchanger thermally communicating with the atmosphere within a closed structure;
   a second heat exchanger thermally communicating with the atmosphere external to said structure and fluidly interconnected with said first heat exchanger for the circulation of a fluid medium therebetween to effect a net heat transfer between said atmosphere;
   and a switchover valve fluidly interconnected with said first and second heat exchanger to selectively effect a fluid medium flow reversal within said system from a first operating mode wherein heat is expelled from said structure, to a second operating mode wherein usuable heat is transferred into said structure, said valve comprising,
(i) body means defining an inlet port, first and second reversing valve ports, and a suction port,
(ii) first valve means operative to selectively interconnect said inlet port and said first reversing valve port for fluid communication therebetween,
(iii) actuator means operatively engaging said first valve means to establish said fluid communication in response to a control signal,
(iv) second valve means operative to selectively interconnect said inlet port and said second reversing valve port as a function of sensed fluid pressure differential between said inlet port and said first reversing valve ports; and
(v) third valve means operative to selectively, alternately interconnect said suction port with said first and second reversing valve ports as a function of sensed fluid pressure differential between said suction port and said first and second reversing valve ports.

13. The system of claim 12, further comprising compressor means operative to circulate said fluid medium between said first and second heat exchanges.

14. The system of claim 13, wherein said inlet and suction ports are connected to fluid outlet and inlet ports, respectively, within said compressor and said first and second reversing valve ports are connected to said first and second heat exchangers, respectively.

* * * * *